US012591364B2

(12) United States Patent
Tiku et al.

(10) Patent No.: US 12,591,364 B2
(45) Date of Patent: Mar. 31, 2026

(54) IN-SITU MEMORY COMPRESSION

(71) Applicant: Micron Technology, Inc., Boise, ID (US)

(72) Inventors: Saideep Tiku, Fort Collins, CO (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/670,243

(22) Filed: May 21, 2024

(65) Prior Publication Data

US 2024/0393945 A1     Nov. 28, 2024

Related U.S. Application Data

(60) Provisional application No. 63/504,089, filed on May 24, 2023.

(51) Int. Cl.
*G06F 3/06* (2006.01)

(52) U.S. Cl.
CPC ............ *G06F 3/0608* (2013.01); *G06F 3/064* (2013.01); *G06F 3/0659* (2013.01); *G06F 3/0673* (2013.01)

(58) Field of Classification Search
CPC ...... G06F 3/0608; G06F 3/064; G06F 3/0659; G06F 3/0673
See application file for complete search history.

(56) References Cited

U.S. PATENT DOCUMENTS

| | | | | |
|---|---|---|---|---|
| 10,691,529 | B2 * | 6/2020 | Gopal | G06F 11/1004 |
| 2007/0067483 | A1 * | 3/2007 | Fallon | H04L 69/04 |
| | | | | 710/68 |
| 2014/0108700 | A1 * | 4/2014 | Li | G06F 9/45533 |
| | | | | 711/6 |

OTHER PUBLICATIONS

"Memory allocation among processes", https://developer.android.com/topic/performance/memory-management, updated Mar. 21, 2023, 6 pages.
Li, et al., "RRAM-DNN: An RRAM and Model-Compression Empowered All-Weights-On-Chip DNN Accelerator", IEEE Journal of Solid-State Circuits, vol. 56, No. 4, Apr. 2021, 11 pages.

* cited by examiner

*Primary Examiner* — Eric Cardwell
(74) *Attorney, Agent, or Firm* — Brooks, Cameron & Huebsch, PLLC

(57)     ABSTRACT

The subject application relates to in-situ compression of data in a main memory and storing of the compressed data in the same main memory to improve memory optimization. A hardware logic of a memory device may receive modified pages from a first portion of memory array, cause a page compression accelerator in the hardware logic to compress the received modified pages to generate compressed data, and facilitate storing of the compressed data to a second portion of memory array of the same memory device. By using in-situ data compression, memory optimization in a computing device is improved.

16 Claims, 6 Drawing Sheets

200

301

303

RECEIVE, BY A MEMORY CONTROLLER, A MEMORY RECLAMATION COMMAND

305

IN RESPONSE TO THE RECEIVED MEMORY RECLAMATION COMMAND, RECEIVE DATA FROM A FIRST MEMORY ARRAY

307

CAUSE A PAGE COMPRESSION ACCELERATOR (PCA) IN A SECOND MEMORY ARRAY TO COMPRESS THE DATA TO GENERATE A COMPRESSED DATA

309

STORE THE COMPRESSED DATA IN THE SECOND MEMORY ARRAY

411

413

RECEIVE, BY A HARDWARE LOGIC, A MEMORY RECLAMATION COMMAND

415

CAUSE, BY THE HARDWARE LOGIC, A RETRIEVAL OF DATA FROM A RANDOM ACCESS MEMORY (RAM)

417

CAUSE, BY THE HARDWARE LOGIC, A PAGE COMPRESSION ACCELERATOR (PCA) TO COMPRESS DATA TO GENERATE A COMPRESSED DATA

419

STORE THE COMPRESSED DATA TO A COMPRESSED CACHE (ZRAM)

521

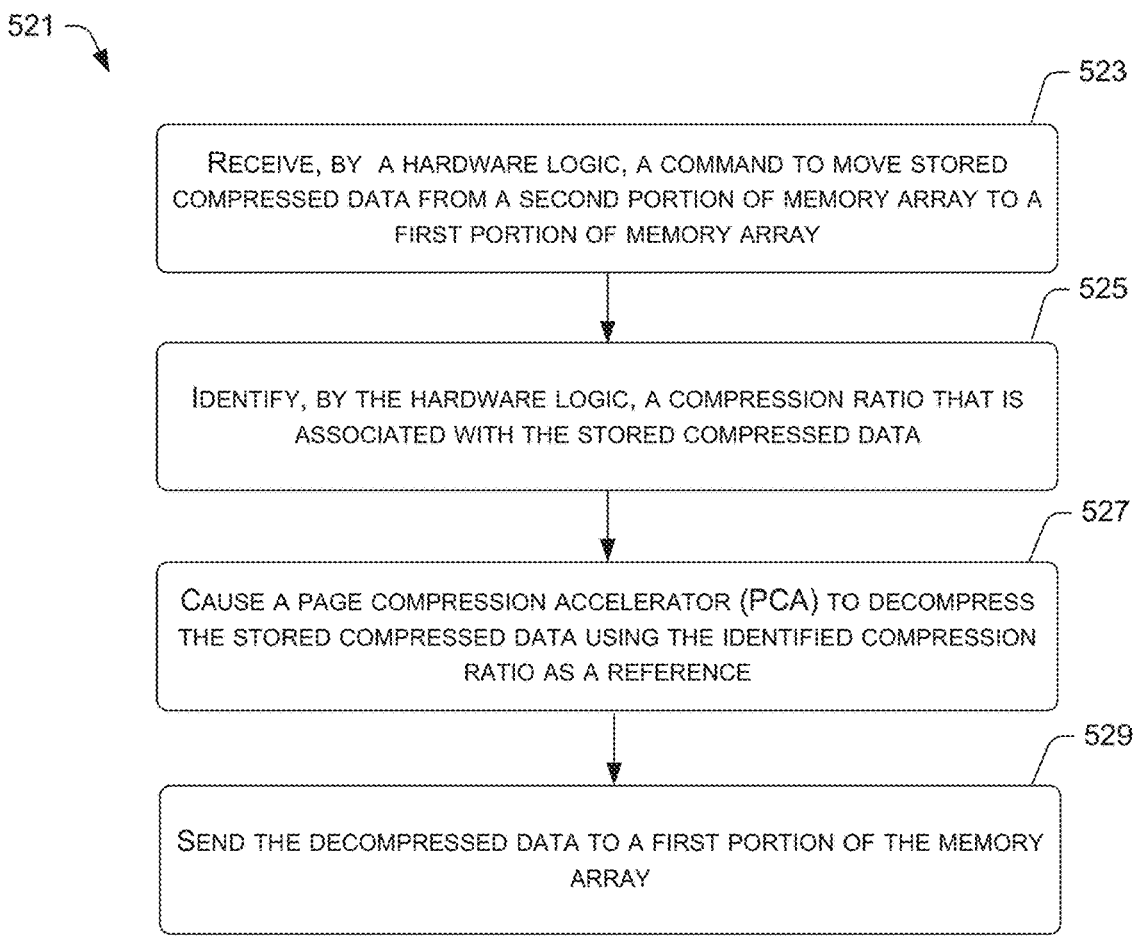

523

RECEIVE, BY A HARDWARE LOGIC, A COMMAND TO MOVE STORED COMPRESSED DATA FROM A SECOND PORTION OF MEMORY ARRAY TO A FIRST PORTION OF MEMORY ARRAY

525

IDENTIFY, BY THE HARDWARE LOGIC, A COMPRESSION RATIO THAT IS ASSOCIATED WITH THE STORED COMPRESSED DATA

527

CAUSE A PAGE COMPRESSION ACCELERATOR (PCA) TO DECOMPRESS THE STORED COMPRESSED DATA USING THE IDENTIFIED COMPRESSION RATIO AS A REFERENCE

529

SEND THE DECOMPRESSED DATA TO A FIRST PORTION OF THE MEMORY ARRAY

FIG. 5

IN-SITU MEMORY COMPRESSION

PRIORITY INFORMATION

This application claims he benefits of U.S. Provisional Application No. 63/504,089, filed on May 24, 2023, the contents of which are incorporated herein by reference.

TECHNICAL FIELD

The present disclosure relates generally to memory, and more particularly to apparatuses and methods associated with data compression and storage of compressed data in a main memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

BRIEF DESCRIPTION OF THE DRAWINGS

FIG. 5 is a flow diagram of a method for implementing a memory optimization in accordance with a number of embodiments of the present disclosure.

DETAILED DESCRIPTION

Figure 1:
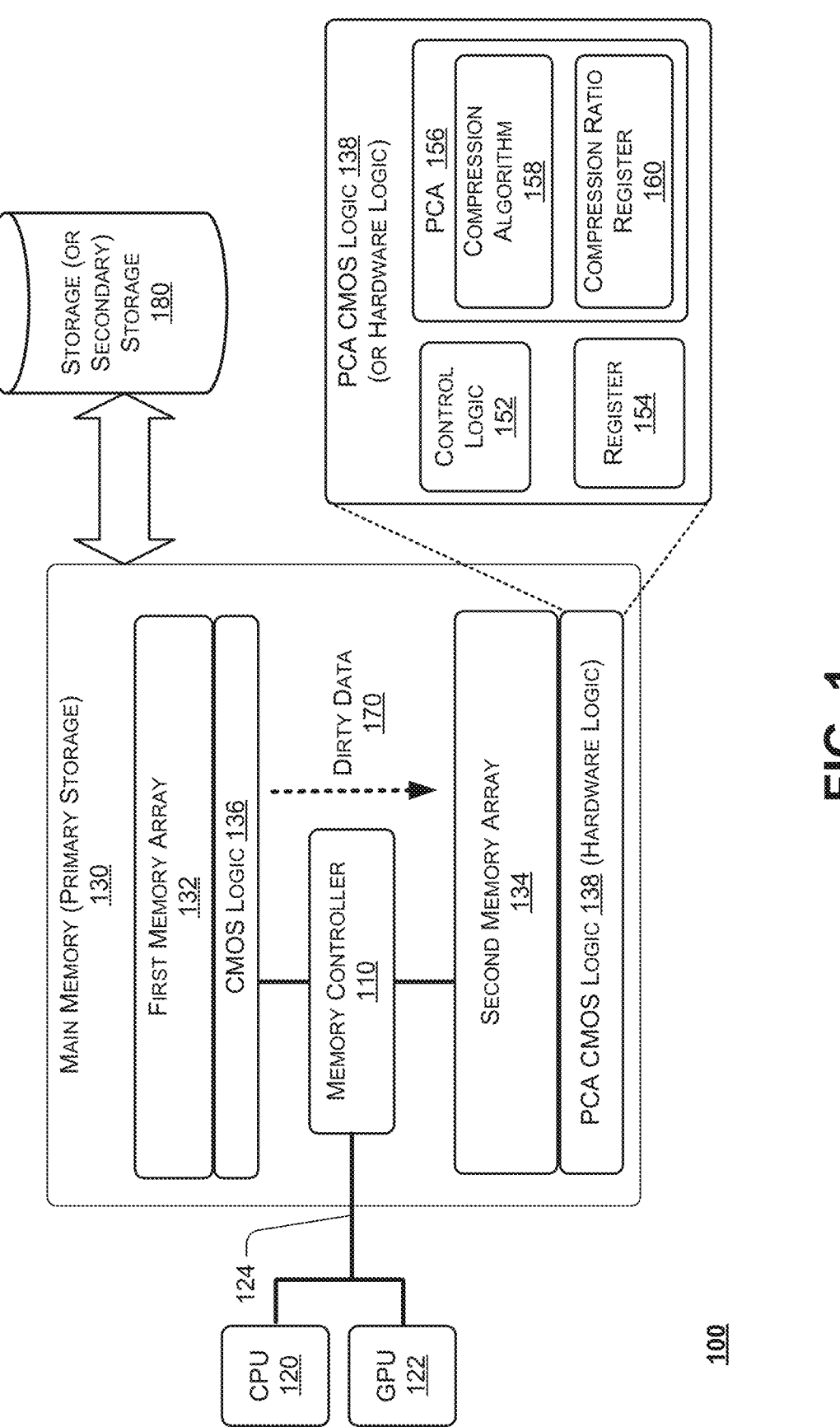
FIG. 1 is a functional block diagram in the form of a computing device that implements in-situ compression and decompression of data in accordance with a number of embodiments of the present disclosure.

The present disclosure includes apparatuses and methods related to in-situ compression of data in a main memory and storing of the compressed data in the main memory to improve memory optimization. Main memory may also be referred to as primary storage. A common example of main memory is RAM. Main memory is typically directly accessible by a processor, such as a central processing unit (CPU) or graphics processing unit (GPU). The processor reads instructions stored in main memory and executes them as required. In contrast, secondary storage typically is not directly accessible by the processor and is used for persistent storage of data. Secondary storage typically has slower access times than primary storage. Secondary storage may also be referred to simply as "storage." Most systems have a significantly greater secondary storage capacity than primary storage capacity.

Main memory is typically managed by an operating system, which is executed by the processor. One example of such an operating system is Linux. The operating system can maintain a page cache in the main memory so that pages from secondary memory can be operated on quickly and efficiently by the processor from the main memory. When a page from the secondary storage is loaded to the main memory and changed therein without being moved back to the secondary storage, it may be referred to as a dirty page.

One function provided by the operating system is to manage used and free memory. Some operating systems try to use as much of (or all) of the available memory at all times. For example, data and/or instructions associated with an application may be retained in main memory, if there is sufficient free memory, after the application has been closed by a user so that the user can quickly restart the application. With respect to the main memory, various processes exist for converting used memory to free memory. For example, in a Linux kernel that manages operating system resources, a swap daemon, referred to as "kswapd" can become active when free memory on a device runs low. The Linux kernel can maintain low and high memory thresholds. When free memory falls below the low threshold, kswapd starts to reclaim memory. Once the free memory reaches the high threshold, kswapd stops reclaiming memory.

During memory reclamation in the main memory, modified pages are marked as dirty pages and may be compressed by the processor. The compressed pages can be moved to a compressed cache or compressed block storage in the main memory, which may be referred to as zRAM. zRAM can be implemented as a partition in the RAM and used for swap space. For example, the Linux kernel can compress a memory page from the RAM and store the compressed memory page in the zRAM. Doing so frees up a memory page in the RAM. When a process needs to access a memory page that has been compressed and transferred to zRAM, it is decompressed by the processor and brought back into the RAM. If the process associated with a compressed page is killed, the page is deleted from the zRAM. The portion of RAM used as zRAM can grow or shrink in size as pages are moved into or taken out of the zRAM. The compression of data and decompression of data by processors(s) in a host, and high-speed interfaces between the host and memory module for these processes can waste significant compute and energy resources.

Aspects of the present disclosure address the above and other deficiencies. In one aspect, the main memory may include an in-situ page compression accelerator (PCA) to compress the dirty pages before storing the compressed dirty pages in a memory array or a portion of the memory array of the main memory. This can reduce the energy expended on data movement between the main memory and the host processor and can relieve the host processor of the burden of compressing and/or decompressing pages of memory. The PCA can be built into complimentary metal oxide semiconductor (CMOS) logic, which can be fabricated under an array of memory cells of the main memory. Such logic may be referred to as CMOS-under-the-array (CuA). In some embodiments, the logic may be formed separately on a die or memory package that includes the memory array. In such embodiments, the logic may be coupled to the memory array rather than being fabricated under it. In some embodiments, the main memory of a system may be provided by a memory package including separate memory dies, at least one of which includes a PCA formed in the CMOS logic and at least one of which does not include a PCA. In such embodiments, a memory controller coupled to the memory dies can facilitate movement of data from one die to another (e.g., from a die not including the PCA to a die including the PCA) so that it may be compressed without being transferred to the host processor. The compressed data can then be stored either in the die without the PCA via an additional data transfer facilitated by the memory controller or in the die with the PCA without an additional data transfer.

In another aspect, the main memory may be configured to perform the storing and/or retrieval of the dirty pages with a smaller number of instructions or commands from a requesting host. For example, a memory controller may receive a command from the host to move the data from a first memory array to a second memory array of the main memory. Responsive to receipt of the single command, the memory controller of the main memory can perform the retrieval of the data from the first memory array, cause compression of the retrieved data, and facilitate storing of the compressed data at the second memory array in the absence of additional commands from the host. This can reduce traffic across interface channels between the host and the main memory, which can increase performance of a computing device associated with the host and/or the main memory.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The figures herein follow a numbering convention in which the first digit or digits correspond to the drawing figure number and the remaining digits identify an element or component in the drawing. Similar elements or components between different figures may be identified by the use of similar digits. For example, 156 may reference element "56" in FIG. 1, and similar element may be referenced as 256 in FIG. 2. Further, analogous elements within a Figure may be referenced with a hyphen and extra numeral or letter. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an example computing system 100 including a memory controller 110 that couples a CPU 120 and/or a GPU 122 to a main memory device 130 (also referred to as primary memory) and/or to a storage device 180 (also referred to as secondary memory). As described herein, the computing system 100, memory controller 110, CPU 120, GPU 122, main memory device 130, first memory array 132, and the second memory array 134 may be considered as "apparatus." The main memory device 130 can provide physical memory or primary memory for the CPU 120 and/or GPU 122 or can be used as additional memory or storage for the CPU 120 and/or GPU 122. The main memory device 130 can be, but is not limited to a volatile memory device (e.g., RAM, such as DRAM, SDRAM, etc).

Storage 180 may provide persistent data storage for the computing system 100. The storage 180 may also include one or more controllers (not shown) that can be configured to carry out various storage tasks. Storage tasks may include writing data received from the main memory device 130, erasing data in storage array (not shown) of the storage 180, retrieving data from the storage array, monitoring and reporting of disk utilization and performance, performing redundancy operations, and the like. Examples of a storage device 180 include non-volatile memory such as a solid state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). The storage device 180 can include not-and (NAND) type flash memory. NAND type flash memory includes, for example, two-dimensional NAND (2D NAND) and three-dimensional NAND (3D NAND). The storage device 180 can be another type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM), and three-dimensional cross-point memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

The computing system 100 can be a computing device such as a desktop computer, laptop computer, network server, mobile device such as a mobile phone, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device. In some embodiments, the system 100 is a system on a chip (SoC).

The CPU 120 and/or GPU 122 can be communicatively coupled to the memory controller 110 via one or more interfaces 124. The interface 124 can include physical connections that allow signals indicative of data and/or commands to be transferred between the main memory device 130 and the CPU 120 and/or GPU 122. For example, a memory reclamation command to free blocks of pages in the main memory device 130 can be transferred from the CPU 120 to the main memory device 130 via interface 124. In this example, interfaces 124 employ a suitable protocol such as a Peripheral Component Interconnect Express (PCIe), Gen-Z interconnect, cache coherent interconnect for accelerators (CCIX), etc.

The CPU 120 may include one or more processors and other electronic circuitry that execute instruction code segments by performing basic arithmetic, logical, control, memory, and input/output (I/O) operations specified by the instruction code. In an embodiment, the CPU 120 may be coupled to the main memory device 130 and other hardware components used to carry out device operations. The other hardware components may include one or more user interface hardware components not shown individually—such as a keyboard, a mouse, a display, a microphone, a camera, and/or the like.

The GPU 122 may include a specialized processor designed to handle the computations necessary for rendering graphics, images, and video. The GPU 122 may work in conjunction with the CPU 120 to handle the workload of the computing system 100 by offloading graphics-related calculations to the GPU 122 and freeing the CPU 120 to handle other tasks.

The memory controller 110 can communicate with the memory arrays 132, 134 and/or CMOS logic 136 and PCA CMOS logic 138 to perform operations such as reading data, writing data, and other such operations. In some implementations, the memory controller 110 may represent one or more general—purpose processing devices such as a microprocessor, central processing unit, or the like. More particularly, the memory controller 110 may be a complex instruction set computing (CISC) microprocessor, reduced instruction set computing (RISC) microprocessor, very long instruction word (VLIW) microprocessor, or a processor implementing other instruction sets. The memory controller 110 may also be one or more special—purpose processing devices such as an application specific integrated circuit (ASIC), a field programmable gate array (FPGA), a digital signal processor (DSP), network processor, or the like.

The memory controller 110 can move data from a first memory array 132 to a second memory array 134. For example, in response to a received command from the CPU 120 and/or the GPU 122, the memory controller 110 may be configured to implement the moving of the data by causing a retrieval of the data from the first memory array 132, compression of the retrieved data to generate compressed data, and storing of the compressed data to the second memory array 134. For purposes of illustration, FIG. 1 shows the second memory array 134 that can store the compressed data such as compressed dirty data 170. The compression of the retrieved data may be implemented via an in-situ page compression accelerator (PCA) in a PCA CMOS logic 138 that is coupled to the second memory array 134. The first memory array 132 can be on a first memory die. The first memory die can include a CMOS logic 136. The CMOS logic 136 can be formed in CuA of the first memory die. The second memory array 134 can be on a second memory die. The second memory die may include the PCA CMOS logic 138. The PCA CMOS logic 138 can be formed in CuA of the second memory die. In this example, the PCA CMOS logic 138 is a hardware logic that includes the PCA as a component while the CMOS logic 136 is a hardware logic that does not include the PCA as a component. As described herein, the PCA CMOS logic 138 is interchangeably referred to as the hardware logic that can be coupled to a memory array such as the second memory array 134. The PCA CMOS logic 138 may include, without limitation, a control logic 152, register 154, and a PCA 156 including a compression algorithm 158 and a compression ratio register 160. The PCA CMOS logic 138 may further include basic other circuitries to implement a wide range of digital logic functions.

In an embodiment, the CPU 120 and/or GPU 122 may send a memory reclamation command (not shown) to the memory controller 110 to move the dirty data such as dirty data 170 from the first memory array 132 to the second memory array 134. The first memory array 132 or the second memory array 134 may include a type of RAM array such as a DRAM array, SRAM array, STT RAM array, PCRAM array, TRAM array, or RRAM array, although embodiments are not limited to these examples. The amount of RAM in the main memory device 130 may vary depending upon the specific device. For example, a particular computing device may include 8 GB of RAM while another computing device that is used for gaming applications may include 64 GB of RAM. In the illustrated example, the main memory device 130 may include two 4 GB RAM chips which can be separately controlled by their respective hardware logic. In this embodiment, responsive to the received memory reclamation command, the memory controller 110 may initiate the retrieval of the dirty data 170 from the first memory array 132, cause the compression of the dirty data 170 via the PCA 156 to generate compressed data, and facilitate storing of the compressed data in the second memory array 134. The memory controller 110 may implement this process without additional command from the CPU 120 and/or GPU 122 to minimize high-speed interfaces between the CPU 120 and/or GPU 122 and the main memory device 130 that can consume a lot of energy. After execution of the command, the memory controller 110 may send an interrupt to the CPU 120 and/or GPU 122 to indicate the execution of the memory reclamation command.

Memory controller 110 may include hardware, software, or a combination thereof, that manages the flow of data going to and from the main memory device 130. For example, the memory controller 110 may enable the main memory device 130 to interact with the processors (not shown) of the CPU 120. In another example, the memory controller 110 may couple the CPU 120 or GPU 122 to the storage 180. In some embodiments, the memory controller 110 may send an interrupt (not shown) to the CPU 120 to indicate that the process has been executed or a page fault has been detected. In one aspect, the memory controller 110 may execute the memory reclamation command without an intervening command from the CPU 120. For example, the memory controller 110 may include sufficient instructions or processing resources such as the PCA 156 to implement the command without receiving additional commands from the CPU 120. In this example, the command may include the compression of the data using a particular algorithm and storing of the compressed data in the second memory array 134.

CMOS logic 136 is a digital logic circuit that is based on a combination of n-type and p-type MOSFETs to implement logic gates and other digital circuitry. When coupled to the first memory array 132, the CMOS logic 136 may be used to control read and write operations of memory cells, which are organized into rows and columns. Here, the CMOS logic 136 may be responsible for selecting the appropriate row and column address lines to access a specific memory location and for controlling the timing and voltage levels sent to the memory cells.

PCA CMOS logic 138 is also a digital logic circuit that is based on a combination of n-type and p-type MOSFETs to implement logic gates and other digital circuitry. However, in contrast with the CMOS logic 136, the PCA CMOS logic 138 may include the PCA 156 as a component for compression or decompression of data. When coupled to the second memory array 134, the PCA CMOS logic 138 may not only be used to control read and write operations of memory cells but also to implement the compression or the decompression of data as described herein. In some embodiments, the PCA CMOS logic 138 is implemented as a hardware logic that can be configured for a particular design. For example, the PCA CMOS logic 138 may include the PCA 156 to perform the compression or decompression of data.

The first memory array 132 and the second memory array 134 are apparatuses, which can be part of memory chips or memory packages that can provide physical memory for the processors or can be used as additional memory or primary storage for the computing system 100. In one example, the first memory array 132 and/or the second memory array 134 can be part of a three-dimensional stack (3DS) memory package. As further described in FIG. 2, the memory package can be a memory package that includes a first die and a second die. For example, the first memory array 132 is formed on the second die while the CMOS logic 136 is formed on the first die of the same memory package. In another example, the second memory array 134 is formed on the second die of a second memory package while the PCA CMOS logic 138 is formed on the first die of the second memory package.

The PCA 156 may include a special-purpose digital logic circuit that implements compression or decompression of data. In some embodiments, the PCA 156 can be an ASIC, an FPGA, or a DSP. The PCA 156 may be configured to compress and/or decompress data according to a compression algorithm 158. As illustrated in FIG. 1, the compression algorithm 158 is a logical representation of the portions of the physical configuration of the PCA 156, by which it is configured to compress and/or decompress data. Compressing the dirty data 170 can allow the dirty data 170 to be stored as fewer bits than in the original representation of the dirty data 170. In one aspect, the PCA 156 may store a compression ratio in the compression ratio register 160 and during a later access, the PCA 156 may be configured to compress or decompress data according to the stored compression ratio as a reference for decompressing the stored compressed data.

The control logic 152 may be configured to receive and decode commands, store decoded commands in the register 154, and distribute the decoded commands to the PCA 156 or the second memory array 134, which can also include a separate control logic (not shown). The control logic 152 may be implemented using combinational logic circuits such as logic gates, multiplexers, and decoders. In some embodiments, the control logic 152 may be configured to generate control signals to perform a desired operation such as reading data from or writing data to the second memory array 134. The generated control signals may also cause the PCA 156 to perform compression or decompression of data. The control logic 152 may also be configured to handle error detection and correction, synchronization, or other functions for implementing the compression or decompression of data in the PCA 156.

In an example operation of the computing system 100, the CPU 120 and/or GPU 122 may execute an application (or program) by reading an instruction from the main memory device 130 and decoding a read instruction. In decoding the instruction, the CPU 120 and/or GPU 122 may need to fetch or store contents of a location in the main memory device 130. The CPU 120 and/or GPU 122 may then execute the instruction and move onto the next instruction in the application. In this regard, the CPU 120 and/or GPU 122 may frequently access the main memory device 130 to fetch instructions or to fetch and store data.

In a case where the application needs to bring a virtual page into the main memory device 130 and there are no free physical pages available in the first memory array 132, for example, then the CPU 120 and/or GPU 122 may create room for this page by discarding another page from the first memory array 132. For example, the CPU 120 and/or GPU 122 may discard the page if the page has yet to be modified.

However, if the page to be discarded from the first memory array 132 has been modified, then the CPU 120 and/or GPU 122 may preserve the contents of the modified page by storing the contents in the second memory array 134 for later access. For example, the dirty data 170 may be representative of the contents of the modified page. In this example, the dirty data 170 may include cached private dirty pages or anonymous dirty pages that need to be preserved for later access by the process. Private dirty pages are owned by one process and not shared. Anonymous dirty pages are not backed by a file in the storage 180.

In an embodiment, the CPU 120 and/or GPU 122 may send a memory reclamation command to the memory controller 110 to move the dirty data 170 from the first memory array 132 to the second memory array 134. Responsive to the memory reclamation command, the memory controller 110 may cause retrieval (or reading) of the dirty data 170 from the first memory array 132 and send the retrieved dirty data 170 including the data compression command to the PCA CMOS logic 138.

The PCA CMOS logic 138 as the hardware logic for the second memory array 134 may utilize the control logic 152 to receive the dirty data 170 and the data compression command. The control logic 152 may then generate and send control signals to the PCA 156 to perform the compression of the retrieved dirty data 170. For example, the control signals may indicate the compression ratio to be used, size of the data, and the like.

With the received control signals from the control logic 152, the PCA 156 may then perform the compression of the dirty data 170. In some embodiments, the control logic 152 may send or cause the storing of the compressed dirty data 170 to the second memory array 134.

In a case where the application needs to write to an area of the virtual memory whose contents were already moved to the second memory array 134, for example, the accessing may trigger a page fault. The CPU 120 and/or GPU 122 detects the page fault and in response to the detected page fault, the CPU 120 and/or GPU 122 may then send a command to the memory controller 110 to move the stored compressed data from the second memory array 134 back to the first memory array 132.

Responsive to the received command, the memory controller 110 may send the data decompression command to the hardware logic (PCA CMOS logic 138) of the second memory array 134. The PCA CMOS logic 138, for example, may use the control logic 152 to receive the data decompression command from the memory controller 110.

In response to the received data decompression command, the control logic 152 may cause the retrieval of the compressed data from the second memory array 134. The control logic 152 may also generate and send control signals to the PCA 156 to perform the decompression of the retrieved data.

The memory controller 110 may cause the decompressed data to be moved to and/or stored in the first memory array 132. Such movement and/or storage can be referenced by an updated page table. The application running in the CPU 120 and/or GPU 122 may then continue its execution upon storing of the decompressed data in the first memory array 132. In some embodiments, the control logic 152 may send the decompressed data to the first memory array 132 via the memory controller 110.

Figure 2:
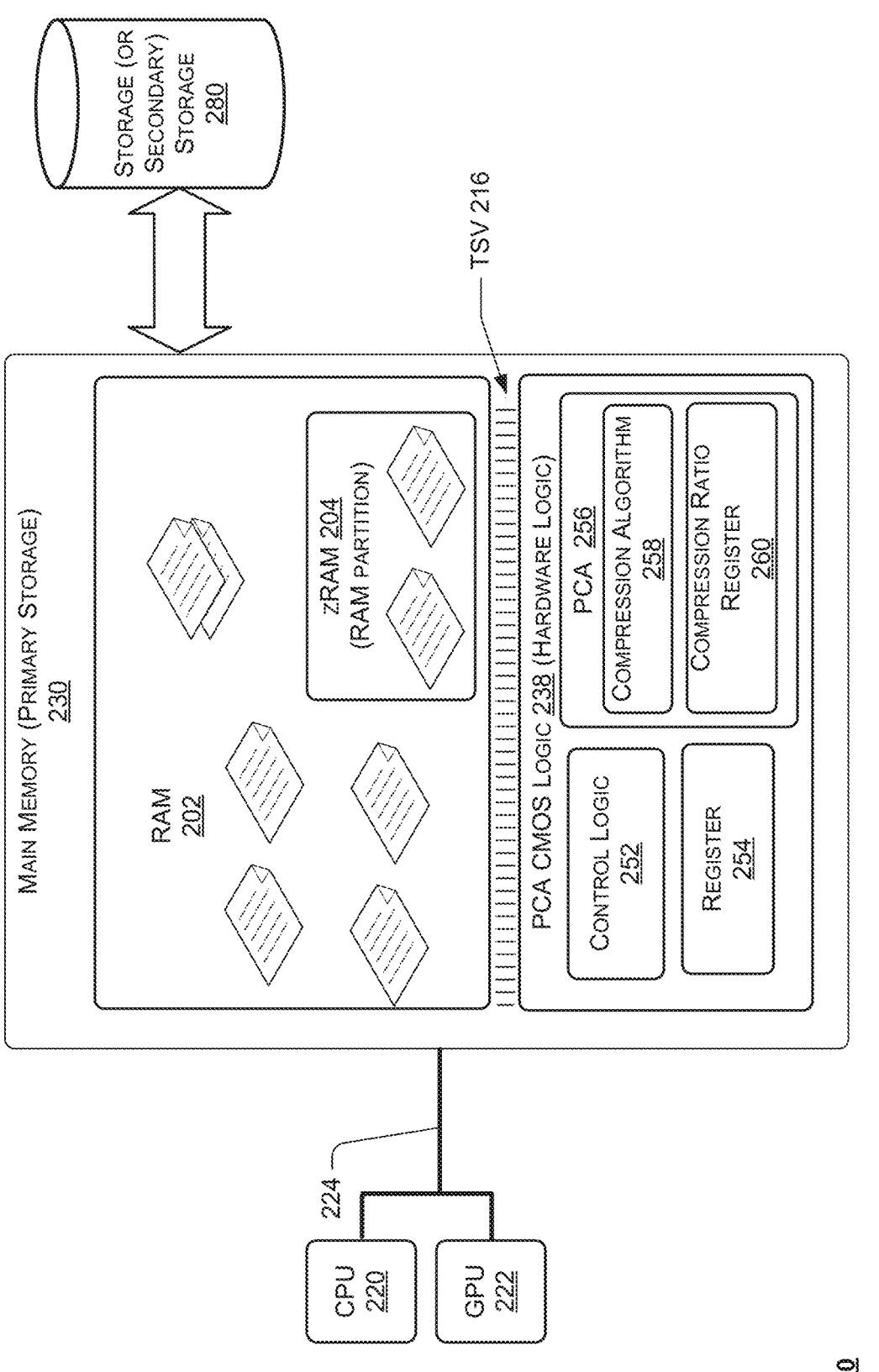
FIG. 2 is a block diagram in the form of the computing device that implements in-situ compression and decompression of data in accordance with a number of embodiments of the present disclosure.

FIG. 2 is a block diagram of an example computing system 200 that implements the in-situ compression of data in the main memory in accordance with embodiments described herein. In contrast with FIG. 1, FIG. 2 illustrates a main memory device 230 that is configured to use the zRAM Linux kernel feature when moving least recently used memory pages or dirty data in RAM 202 to a zRAM 204 (compressed cache), which is a partition of the RAM 202. The zRAM Linux kernel feature may use a portion of the available physical RAM 202 to create the zRAM 204, which acts as the swap space. The swap space can then be used by the Linux kernel to temporarily store compressed dirty data or some of the least frequency used pages of memory in the RAM 202. Here, the zRAM 204 is not a separate physical device or storage medium, but rather a logical construct that is created in the RAM 202 by the kernel. When the kernel needs to access the data that is stored in the zRAM swap space (zRAM 204), a PCA CMOS logic 238 may implement the retrieval of the stored compressed data and the decompression of the stored compressed data. The decompressed data can then be moved to the RAM 202 from the PCA CMOS logic 238. In this case, the page(s) previously occupied by the compressed data in the zRAM 204 may be deleted to create additional free memory.

As shown, the computing system 200 includes the CPU 220, GPU 222, the main memory device 230 as the primary memory, and the storage 280 as the secondary memory. The CPU 220 and/or GPU 222 can be communicatively coupled to the main memory device 230 via one or more interfaces 224. The RAM 202 is representative of the memory array in the main memory 230. The RAM 202 may be coupled to the PCA CMOS logic 238 via a Through Silicon Via (TSV) 216, however embodiments are not so limited. The PCA CMOS logic 238 may include, without limitation, a control logic 252, register 254, and a PCA 256 including a compression algorithm 258 and a compression ratio register 260. The control logic 252, register 254, and the PCA 256 of the PCA CMOS logic 238 are generally analogous to the control logic 152, register 154, and the PCA 156 in the PCA CMOS logic 138 of FIG. 1. However, rather than the PCA CMOS logic 238 receiving the data to be compressed from the memory controller, the PCA CMOS logic 238 may cause the reading of the data from the RAM 202 as further described below.

In the Linux memory management system, the zRAM is a special type of process to free physical pages in the system for efficient memory management. The operating system, via the CPU 220 and/or GPU 222, may regularly check if the number of free pages in the system is getting below the threshold. In response to if the number of free pages in the system is being below the threshold, the operating system may run the zRAM Linux kernel feature that can provide the compressed block storage (zRAM 204) in the RAM 202. The zRAM feature may compress the least recently used pages of memory and/or the dirty data and store them in the zRAM 204. The zRAM 204 may include the zRAM instance created by the Linux kernel. The zRAM instance may include a virtual device created by the Linux kernel that provides a compressed cache in the RAM 202. When the zRAM instance is created, the Linux kernel assigns a certain amount of the RAM 202 to use as its compressed cache. The amount of the RAM 202 that is allocated to the zRAM 204 may depend on system configuration and can be adjusted dynamically based on system needs.

In an embodiment, the CPU 220 and/or GPU 222 may send a memory reclamation command to the main memory device 230. The command may be directly received by the PCA CMOS logic 238 or received by the PCA CMOS logic 238 via the memory controller. More specifically, the memory reclamation command may be received by the control logic 252 of the PCA CMOS logic 238.

Responsive to the received memory reclamation command, the control logic 252 may read, for example, the dirty data (not shown) from the RAM 202, and then generate a control signal to cause the PCA 256 to compress the received dirty data. The control logic 252 may then cause the storing of the compressed dirty data in the zRAM 204 without additional commands from the CPU 120 or the memory controller (not shown).

In a case where the application needs to write to an area of the virtual memory whose contents were already moved to the zRAM 204, for example, such access may trigger a page fault. The CPU 220 and/or GPU 222 can detect the page fault and in response to the detected page fault, the CPU 220 and/or GPU 222 may then send a command to the PCA CMOS logic 238 to move the stored compressed data from the zRAM 204 back to the RAM 202.

Responsive to the received command, the control logic 252 may cause the retrieval of the compressed data from the zRAM 204. The control logic 252 may also generate and send control signals to the PCA 256 to perform the decompression of the retrieved data.

The control logic 252 may cause the decompressed to be moved to and/or stored in the pages in the RAM 202. Such movement and/or storage can be referenced by an updated page table. The application running in the CPU 220 and/or GPU 222 may then continue its execution upon storing of the decompressed data in the RAM 202.

Figure 3:
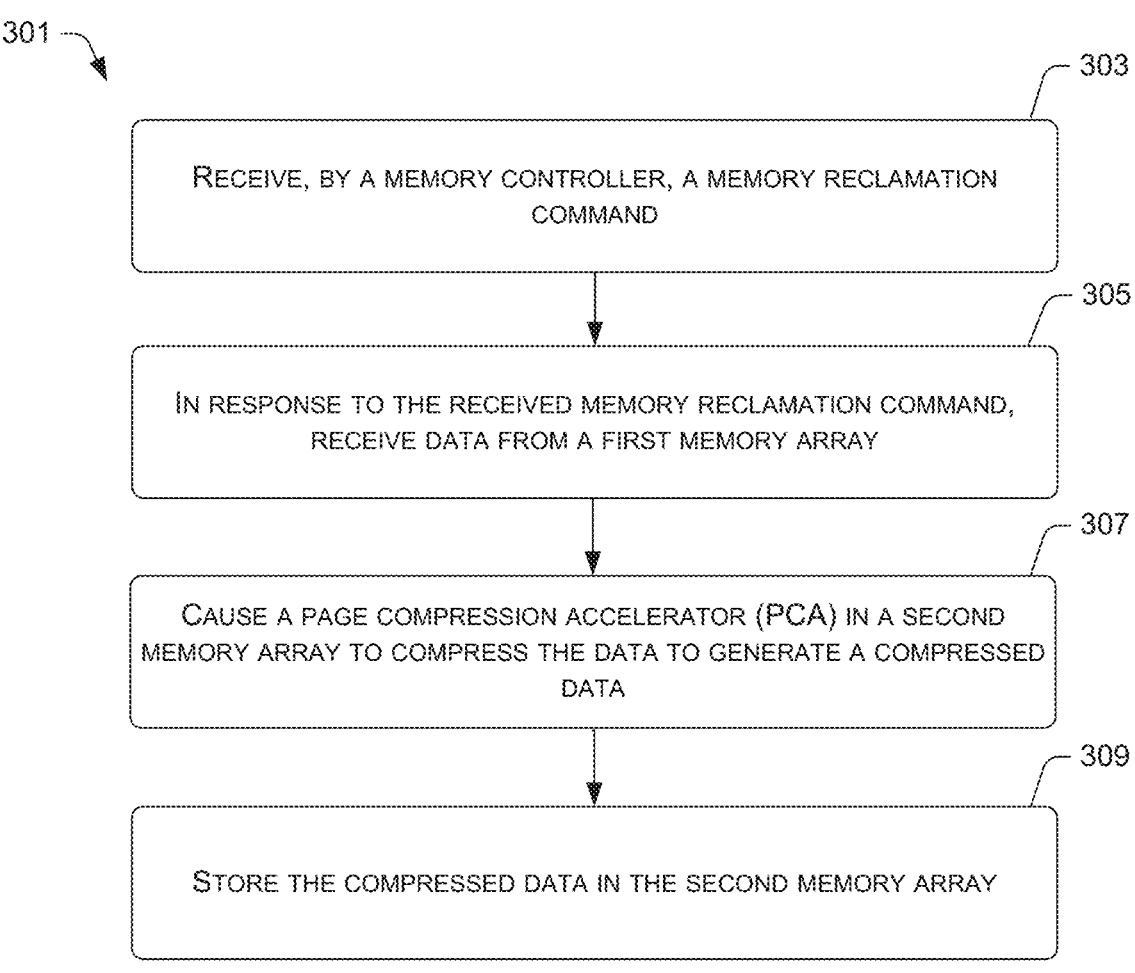
FIG. 3 is a flow diagram of a method for implementing a memory optimization in accordance with a number of embodiments of the present disclosure.

FIG. 3 is a flow diagram of a method 301 for operating a memory device in accordance with a number of embodiments of the present disclosure. The methods described herein can be performed by hardware (e.g., a processing device, circuitry, dedicated logic, programmable logic, microcode, hardware of a device, integrated circuit, etc.). With respect to FIG. 3, for example, the method can be performed by circuitry associated with a memory device, such as the memory device 130 illustrated in FIG. 1. Although shown in a particular sequence or order, unless otherwise specified, the order of the processes with respect to any of the method flow diagrams described herein can be modified. Thus, the illustrated embodiments should be understood only as examples, and the illustrated processes can be performed in a different order, and some processes can be performed in parallel.

At block 303, the method can include receiving, by a memory controller, a memory reclamation command. A CPU and/or GPU may send the memory reclamation command to the memory controller to free blocks of pages in the main memory device, and particularly, to free blocks of pages in a memory array.

At block 305, the method can include receiving, by the memory controller, data from a first memory array. For example, in response to the receiving of the memory reclamation command, the memory controller may be configured to read the dirty data from the first memory array. Here, the first memory array may not include the PCA component in the CMOS logic to save real estate in the memory device. On the other hand, the second memory array may be configured to include the PCA component in the PCA CMOS logic to implement the compression of the dirty data from the first memory array.

At block 307, the method can include causing a PCA in a second memory array to compress the received data to generate compressed data. The memory controller may cause the PCA, via the control logic, to compress the received dirty data. The PCA may use the compression algorithm in the compression algorithm to compress the received dirty data. In one aspect, the PCA may store the compression ratio that was used to compress the dirty data and use the stored compression ratio as a reference for decompressing the stored compressed data during a later access.

At block 309, the method can include storing, by the memory controller, of the compressed data to the second memory array. The memory controller may cause the storing of the compressed data to the second memory array.

Figure 4:
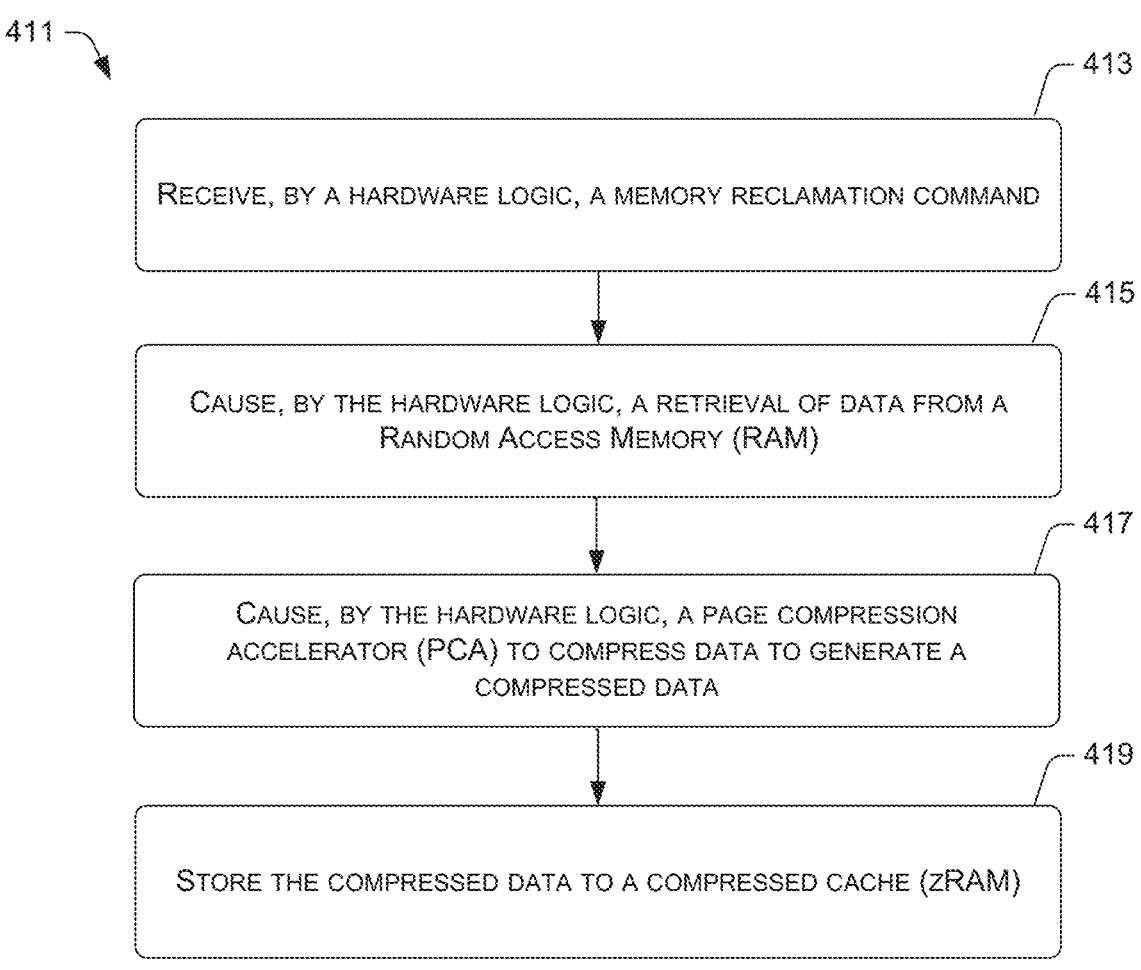
FIG. 4 is a flow diagram of a method for implementing a memory optimization in accordance with a number of embodiments of the present disclosure.

FIG. 4 is a flow diagram of a method 411 for operating a memory device in accordance with a number of embodiments of the present disclosure. For example, the method can be performed by circuitry associated with a memory device, such as the memory device 230 illustrated in FIG. 2.

At block 413, the method can include receiving, by a hardware logic, a memory reclamation command. The hardware logic may receive from the CPU and/or GPU a memory reclamation command to free blocks of pages in the RAM. Particularly, the hardware logic may use control logic to receive the memory reclamation command.

The CPU, GPU, or the memory controller may send the memory reclamation command to the hardware logic to free blocks of pages in the RAM. The memory reclamation command may include compression of the dirty data, information about the dirty data, and the target virtual address in the zRAM for storing the compressed data.

At block 415, the method can include retrieval, by the hardware logic, of data from a RAM. The hardware logic may use control logic to read the dirty data or least frequently used data in the RAM. The control logic may be configured to receive and decode commands, store decoded commands in a register, and distribute the decoded commands to a PCA. The control logic may be configured to generate control signals to perform a desired operation such as reading data from or writing data to the zRAM. The control logic may also be configured to handle error detection and correction, synchronization, or other functions for implementing compression or decompression of data by the PCA.

At block 417, the method can include causing, by the hardware logic, a PCA to compress the data to generate compressed data. The control logic in the hardware logic may generate control signals to cause the PCA to compress the received dirty data or least used data. The PCA may use the compression algorithm in the compression algorithm to compress the received data. The PCA may store the compression ratio that was used to compress the dirty data and use the stored compression ratio as a reference for decompressing the stored compressed data in a later data access.

At block 419, the method can include storing the compressed data in the compressed cache (zRAM). For example, the control logic may cause the storing of the compressed data in the zRAM. In response to the storing of the compressed data in the zRAM, the hardware logic may be configured to erase the data in the RAM. In some embodiments, the zRAM may include the compressed cache for storing compressed dirty data.

In some embodiments, and after storing the compressed data in the second portion of memory array, the control logic may receive a command to move the stored compressed data to the RAM. For example, the stored compressed data is needed by a particular process and the CPU was not able to translate the virtual memory into a physical address and thereby transfer control to the operating system. In this example, the Linux kernel may send a command to move the compressed data from the zRAM to the RAM. The command is received by hardware logic and particularly, the control logic and in response to the received command, the control logic may execute the command by identifying the compression ratio associated with the stored compressed data. The control logic may then cause the PCA to decompress the compressed data using a decompression ratio that corresponds to the identified compression ratio. The control logic may then cause the moving of the decompressed data back to the RAM.

FIG. 5 is a flow diagram of a method for operating a memory device in accordance with a number of embodiments of the present disclosure. For example, the method can be performed by circuitry associated with a memory device, such as the memory device illustrated in FIGS. 1 and 2.

At block 523, the method can include receiving, by a hardware logic, a command to move stored compressed data from a second portion of a memory array to a first portion of the memory array. For example, the RAM may be treated as a first portion of a memory array while the zRAM can be treated as a second portion of the memory array. Because the zRAM is a partition of the RAM, the second portion of the memory array may be treated as a partition of the first portion of a memory array.

In some embodiments, the hardware logic and particularly, the control logic component may receive a command to move the stored compressed data from the zRAM to the RAM. Here, the command to move the stored compressed data may be triggered by a detected page fault in the RAM. For example, the stored compressed data is needed by a particular process and the CPU and/or GPU was not able to translate the virtual memory into a physical address and thereby transfer control to the operating system. In this example, the operating system may use the zRAM Linux kernel software feature to move the stored compressed data from the zRAM to the RAM.

At block 525, the method can include identifying, by the hardware logic, a compression ratio that is associated with the stored compressed data. For example, the control logic may use the compression ratio register to store compression ratio associated with the stored compressed data. In this example, the corresponding compression ratio may be used as a reference to decompress the stored data to be transferred to the RAM.

At block 527, the method can include causing, by the hardware logic, the PCA to decompress the stored compressed data using the identified compression ratio as a reference. For example, the control logic may send controls signals to the PCA to decompress the stored compressed data. In this example, the control logic may identify the compression ratio in the compression ratio register to identify the compression ratio that was used for the stored compressed data. The PCA may use the corresponding compression ratio as a reference for decompressing the compressed data.

At block 529, the method can include sending the decompressed data to the first portion of the memory array. For example, the hardware logic may cause the sending of the decompressed data to the RAM.

The processes as described in blocks 523-529 above may similarly apply to a case where the memory controller 110 in FIG. 1 is configured to move the compressed data from the second memory array 134 to the first memory array 132. Here, the memory controller may receive the command and in response to the received command, the memory controller may cause the control logic to identify the compression ratio that is associated with the stored compressed data, cause the PCA to perform the decompression using the identified compression ratio as a reference, and cause the moving of the decompressed data from the second memory array to the first memory array.

Figure 6:
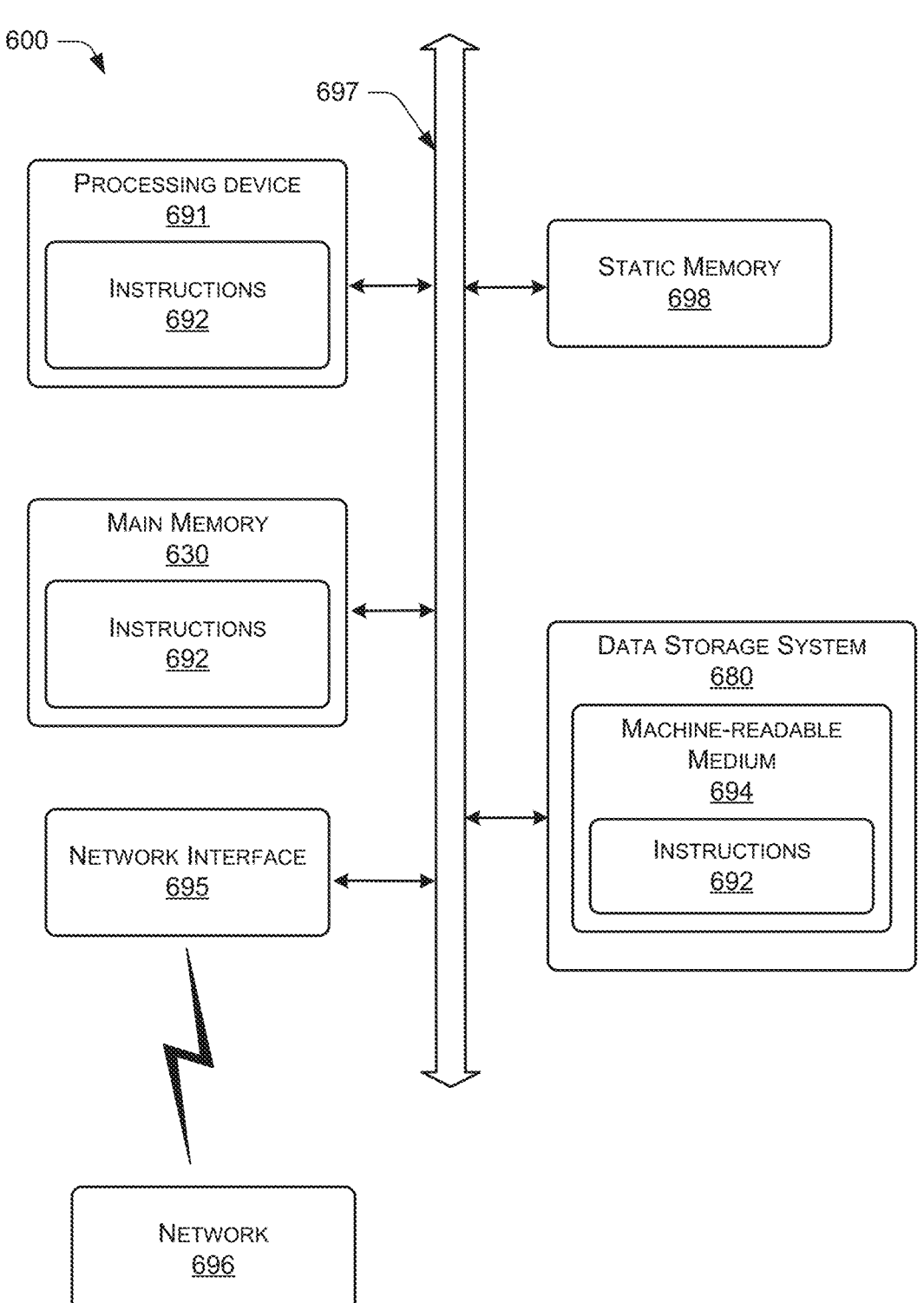
FIG. 6 illustrates an example computer system within which a set of instructions, for causing the machine to perform various methodologies discussed herein, can be executed.

FIG. 6 illustrates an example computer system 600 within which a set of instructions 692, for causing the machine to perform various methodologies discussed herein, can be executed. In various embodiments, the computer system 600 can correspond to a system (e.g., the computing system described with respect to FIGS. 1-2). In alternative embodiments, the machine can be connected (e.g., networked) to other machines in a local area network (LAN), an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 691, a main memory 630, a static memory 698 (e.g., flash memory, static random access memory (SRAM), etc.), and a data storage system 680, which communicate with each other via a bus 697.

The processing device 691 represents one or more general-purpose processing devices such as a microprocessor, a CPU, a GPU, or the like. More particularly, the processing device can be a CISC microprocessor, RISC microprocessor, VLIW microprocessor, or a processor implementing other instruction sets, or processors implementing a combination of instruction sets. The processing device 691 can also be one or more special-purpose processing devices such as an ASIC, an FPGA, a DSP, network processor, or the like. The processing device 691 is configured to execute instructions 692 for performing the operations and steps discussed herein. The computer system 600 can further include a network interface device 695 to communicate over the network 696.

The data storage system 680 can include a machine-readable storage medium 694 (also known as a computer-readable medium) on which is stored one or more sets of instructions 692 or software embodying any one or more of the methodologies or functions described herein. The instructions 692 can also reside, completely or at least partially, within the main memory 693 and/or within the processing device 691 during execution thereof by the computer system 600, the main memory 693 and the processing device 691 also constituting machine-readable storage media.

The instructions 692 can be executed to carry out any of the embodiments described herein. For example, the instructions 692 can be executed to implement functionality corresponding to the host, the memory device, and/or hardware logic of FIGS. 1-2.

While the machine-readable storage medium 694 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A memory module, comprising:

a volatile random access memory (RAM) array; and complimentary metal oxide semiconductor (CMOS) logic under the RAM array on the memory module, the CMOS logic including a page compression accelerator (PCA) that is coupled to the volatile RAM array, wherein the CMOS logic is configured to:

receive data comprising pages marked as dirty pages from a first portion of the RAM array;

cause the PCA to compress the data to generate compressed data; and cause the compressed data to be stored in a second portion of the volatile RAM array; and wherein the memory module is configured to operate as main memory for a computing system.

2. The memory module of claim 1, wherein the CMOS logic is further configured to:

receive a command from a memory controller that is coupled to the CMOS logic, the command includes compressing the data using a compression ratio; and in response to the received command, the CMOS logic is configured to:

cause the PCA to compress the data using the compression ratio; and store the compression ratio associated with the stored compressed data.

3. The memory module of claim 2, wherein the CMOS logic is configured to:

receive a command from the memory controller, the command includes moving the stored compressed data from the second portion of the volatile RAM array to the first portion of the volatile RAM array; and in response to the received command, the CMOS logic is configured to:

identify the compression ratio that is associated with the stored compressed data to be decompressed;

cause the PCA to use the identified compression ratio as a reference for decompressing the stored compression data to generate a decompressed data; and store the decompressed data to the first portion of the volatile RAM array.

4. The memory module of claim 1, wherein the dirty pages include modified pages in the first portion of the volatile RAM array.

5. The memory module of claim 1, wherein the CMOS logic is configured to: cause the PCA to compress the modified pages; and cause the compressed modified pages to be stored in the second portion of the volatile RAM array.

6. The memory module of claim 1, wherein the second portion of the volatile RAM array includes a compressed cache (zRAM) that is a partition of the volatile RAM array.

7. The memory module of claim 1, wherein the second portion of the volatile RAM array includes compressed block storage configured to store the compressed data.

8. A memory module, comprising:

a first volatile random access memory (RAM) array;

a second volatile RAM array;

complimentary metal oxide semiconductor (CMOS) logic under the second volatile RAM array on the memory module, the CMOS logic including a page compression accelerator (PCA) that is coupled to the second volatile RAM array; and a memory controller coupled to the first volatile RAM array and to the second volatile RAM array, wherein the memory controller is configured to move data comprising pages marked as dirty pages from the first volatile RAM array to the second volatile RAM array in response to a memory reclamation command, wherein the CMOS logic is configured to:

cause the PCA to compress the data to generate compressed data; and cause the compressed data to be stored in the second volatile RAM array; and wherein the memory module is configured to operate as main memory for a computing system.

9. The apparatus of claim 8, wherein the CMOS logic is further configured to:

receive a command from the memory controller, the command includes compressing the data using a compression ratio; and in response to the received command, the CMOS logic is configured to:

cause the PCA to compress the data using the compression ratio; and store the compression ratio associated with the stored compressed data.

10. The apparatus of claim 9, wherein the CMOS logic is configured to:

receive a command from the memory controller, the command includes moving the stored compressed data from the second memory array to the first memory array; and in response to the received command, the CMOS logic is configured to:

identify the compression ratio that is associated with the stored compressed data to be decompressed;

cause the PCA to use the identified compression ratio as a reference for decompressing the stored compression data to generate a decompressed data; and send the decompressed data to the memory controller.

11. The apparatus of claim 10, wherein memory controller is configured to store the decompressed data in the first volatile RAM array.

12. The apparatus of claim 8, wherein the memory controller is configured to send an interrupt to a host to indicate the storing of the compressed data.

13. A method, comprising:

receiving, by a complimentary metal oxide semiconductor (CMOS) logic under a volatile random access memory (RAM) array on a memory module, data comprising pages marked as dirty pages from a first portion of the volatile RAM array, wherein the CMOS logic is coupled to the volatile RAM array and includes a page compression accelerator (PCA);

receiving a command at the CMOS logic;

executing the command on the PCA to compress the received data to generate a compressed data;

storing the compressed data to a second portion of the volatile RAM array; and operating the memory module as main memory for a computing system.

14. The method of claim 13, further comprising erasing the data in the first portion of the volatile RAM array in response to the storing of the compressed data in the second portion of the volatile RAM array.

15. The method of claim 13, further comprising:

receiving a command from a memory controller that is coupled to the CMOS logic, wherein the command includes moving the stored compressed data from the second portion of the volatile RAM array to the first portion of the volatile RAM array;

executing the command on the PCA to decompress the stored compressed data to generate a decompressed data; and sending the decompressed data to the memory controller.

16. The method of claim 13, wherein the data includes dirty data.

* * * * *